United States Patent

Jacino et al.

[11] Patent Number: 5,955,113
[45] Date of Patent: Sep. 21, 1999

[54] KIT AND METHOD FOR REPAIRING A BREAK IN THE LENS OF AN AUTOMOBILE LIGHT BULB HOUSING

[76] Inventors: Gerald Jacino, 85-19 118 St., Kew Gardens, N.Y. 11415; Anthony Jacino, 17 Normandie La., East Moriches, N.Y. 11940

[21] Appl. No.: 08/890,569

[22] Filed: Jul. 9, 1997

Related U.S. Application Data

[60] Provisional application No. 60/021,469, Jul. 10, 1996.

[51] Int. Cl.⁶ .................................................. B32B 35/00
[52] U.S. Cl. .......................... 425/11; 29/402.09; 156/94; 206/582; 428/63
[58] Field of Search .................... 156/94, 98; 29/402.09, 29/402.11; 425/11; 206/573, 582; 428/63

[56] References Cited

U.S. PATENT DOCUMENTS

| | | |
|---|---|---|
| 2,833,327 | 5/1958 | Boyce . |
| 3,109,765 | 11/1963 | Petrowsky . |
| 3,138,505 | 6/1964 | Hirsch . |
| 3,388,016 | 6/1968 | Murray et al. . |
| 3,722,114 | 3/1973 | Kowalchuk . |
| 3,841,932 | 10/1974 | Forler et al. . |
| 3,887,413 | 6/1975 | Speer . |
| 3,914,145 | 10/1975 | Forler et al. . |
| 3,939,337 | 2/1976 | Oda et al. . |
| 4,094,316 | 6/1978 | Nathanson . |
| 4,147,576 | 4/1979 | Beem et al. ............................. 156/94 |
| 4,221,465 | 9/1980 | Hannan et al. . |
| 4,280,478 | 7/1981 | Schwartz . |
| 4,473,419 | 9/1984 | Hardy ...................................... 156/94 |
| 4,497,755 | 2/1985 | Korsyn ..................................... 264/17 |
| 4,588,619 | 5/1986 | Fiscus et al. . |
| 4,661,182 | 4/1987 | Lerner . |
| 4,961,883 | 10/1990 | Jacino et al. . |
| 5,401,157 | 3/1995 | Jacino et al. ............................. 425/12 |
| 5,569,346 | 10/1996 | Marshall ................................... 156/94 |

*Primary Examiner*—Daniel Stemmer
*Attorney, Agent, or Firm*—Auslander & Thomas

[57] ABSTRACT

The present invention is a kit and method for the repair of a break in an automobile light bulb housing. The kit and method enable an inexpensive in situ repair including lamina overriding the break. The lamina form an environmentally impervious repair matching the color of the lens and including a light diffusion pattern to diffuse light substantially similar to that of the unbroken lens. The kit includes shapable parts enclosable in a blister pack. The blister cover may include a usable diffuser pattern. The diffuse pattern maintains the environmental imperviousness of the repair.

7 Claims, 4 Drawing Sheets

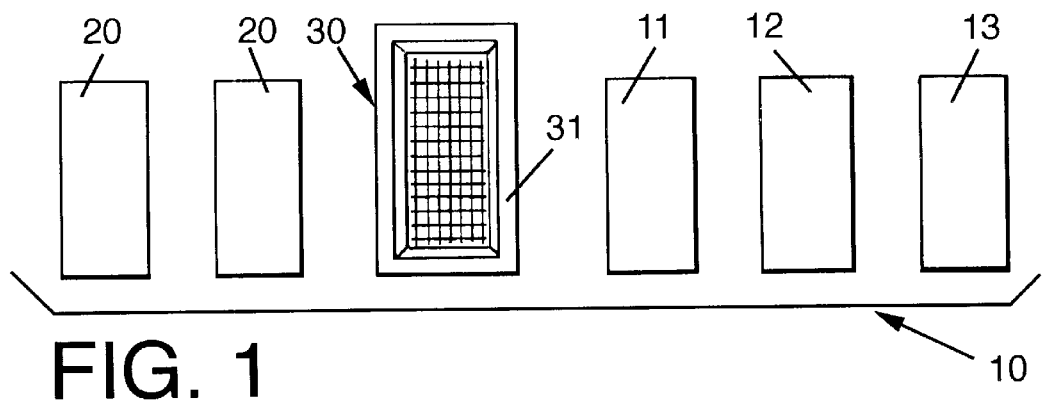
FIG. 1
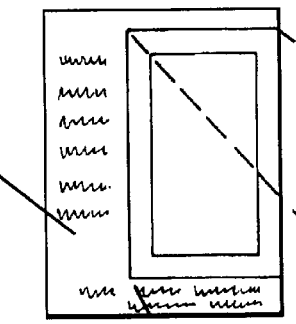
FIG. 2
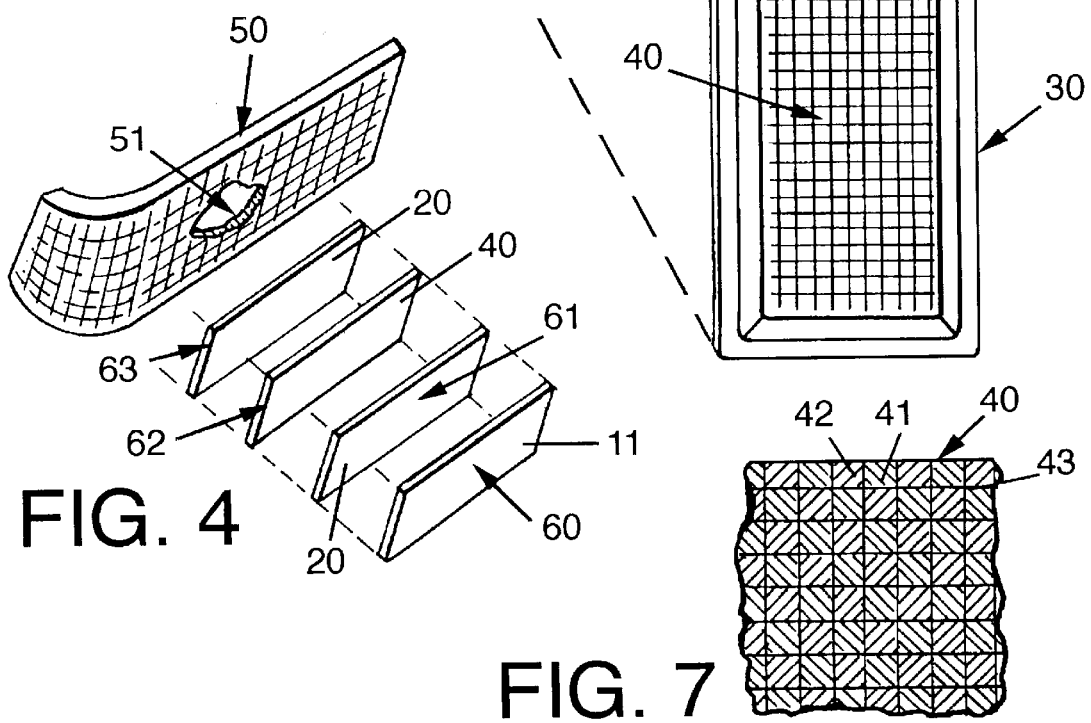
FIG. 4
FIG. 7

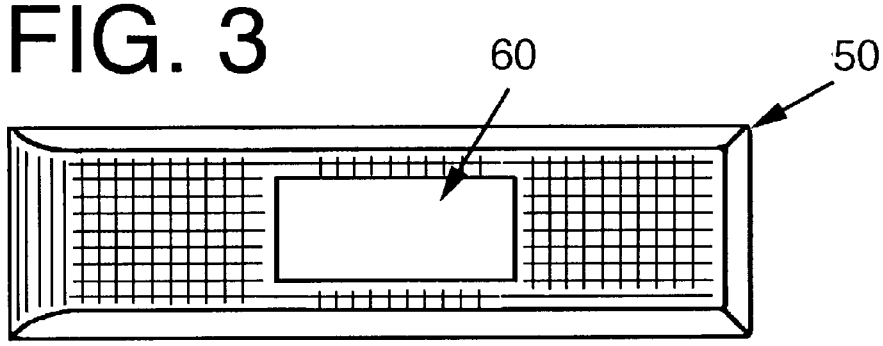
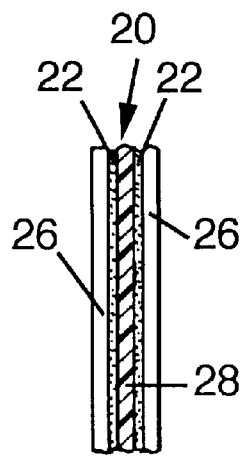
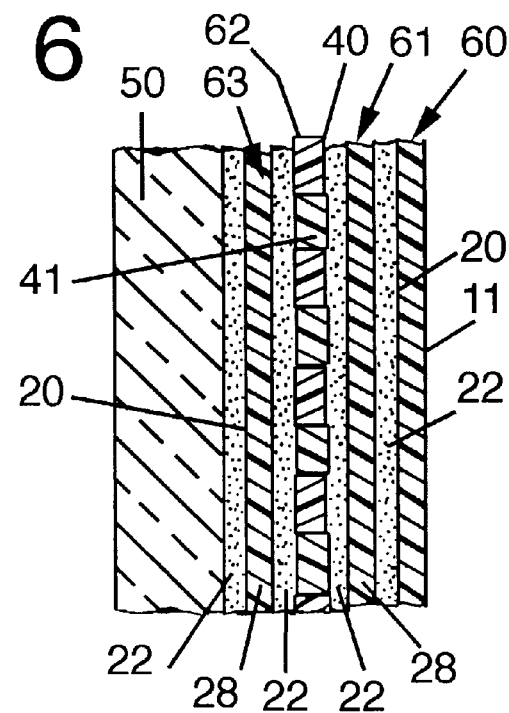
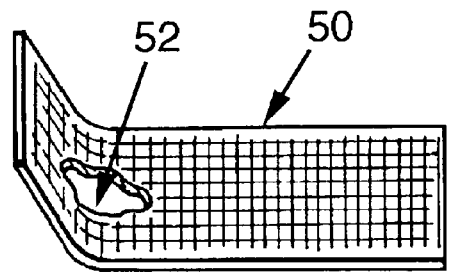
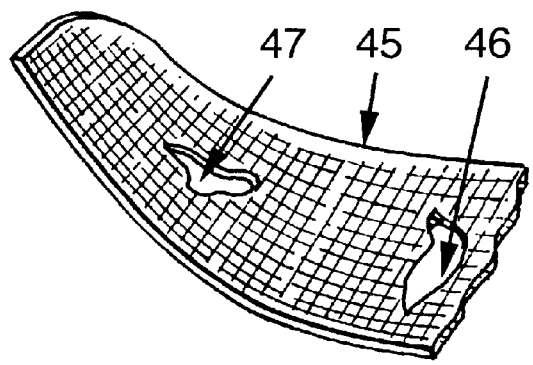

KIT AND METHOD FOR REPAIRING A BREAK IN THE LENS OF AN AUTOMOBILE LIGHT BULB HOUSING

This application is a nonprovisional application of provisional application Ser. No. 60/021,469 filed Jul. 10, 1996.

BACKGROUND OF THE INVENTION

The present invention relates to a kit and method for repairing a break in the lens of an automobile light bulb housing.

Automobile light bulbs are oftentimes engaged in complex, expensive, enclosed housings. The automobile bulb housing holds the light bulb, serves as a reflector, light diffuser and protects the bulb and reflector from the atmosphere.

A break in a lens must be repaired or the expensive automobile light bulb housing must be replaced. Effective repair of an automobile light bulb housing having a light diffuser has been difficult.

Breaks have been difficult to access because of the shape of the break or the housing. The broken area may be colored and it may be difficult to restore the diffusive characteristics of the repaired area.

Oftentimes the only way to effect a repair includes to need to physically remove the automobile light bulb housing. Another problem to be solved in the repair of automobile light bulb housings lens is the need to maintain the light diffusing characteristics of the lens once repaired. Repair of lenses in the past had many similarities to the repair of breaks through glass or plastic and, indeed, automobile light bulb housings are usually glass or plastic.

A major difference between lens repair and glass repair is that the automobile light bulb housing usually requires light diffusion rather than perfect glass clarity.

DESCRIPTION OF THE RELATED ART

In the past, automobile light bulb housings lenses have been repaired by covering the housings with tape just to protect them from the atmosphere.

The tape has been either opaque or translucent. Tapes used in such repair have even been selected to match the color of the broken part of the lens. To repair voids, repairs have been made by the flush filling of the broken spaces; plastic castings were also made to fill breaks. Many different techniques were used.

U.S. Pat. No. 4,497,755 discloses a kit for the repair of automobile light bulb housing lenses by casting the repair. The repair method includes the use of flush tapes to form a releasable form for molding an exothermic adhesive resin to make a repair. Colored resin was used to match colors in the automobile plastic light bulb housing and glass bead were used to simulate the facets in the broken diffuse area.

As shown in U.S. Pat. No. 5,401,152, breaks through glass have been repaired by providing a gasket with a cover to form a mold for a casting including a bead surrounding a repaired area. The gasket and cover define the shape of the repair casting.

U.S. Pat. No. 4,280,478 discloses a pedestal adapted to create a casting to override and surround a break in glass.

U.S. Pat. No. 3,887,413 discloses a method for repairing plastic materials, using an insert backing material, protective paste and graining paper and uses a hot surface, such as iron. See FIG. 1. A flat backing material is used to hold the heat responsive elastic repair material flush with the surface of the patched area.

U.S. Pat. No. 3,772,114 discloses a process for mending fabrics, including the use of an adhesive which contains a color additive to match the area around the repair. The invention is involved with fitting in a flush patch supported on one side.

U.S. Pat. No. 3,388,016 discloses a method and apparatus for patching articles. The method and apparatus are a complex set to apply a fiber glass patch to one surface. Flush liners may be used.

U.S. Pat. No. 3,109,765 discloses a method for repairing surfaces, wherein a textured backing is used. A textured backing hold holds a composition applied from an outer surface of a rupture.

U.S. Pat. No. 4,961,883 discloses a pedestal and a seal surrounding an opening and forming a chamber for the introduction of a repair plastic, forming an irregular bead, which has to be cut off flush. The bead is formed in the central opening 20.

U.S. Pat. No. 4,473,419 discloses the use of a flush patch to a contoured surface for the purpose of making a repair.

U.S. Pat. No. 3,138,505 discloses means for mending fabric, using a heat responsive thermoplastic adhesive backed by a substrate which may be stripped, then bonding a matching patch to the fabric and the adhesive. The patch is ironed on.

U.S. Pat. No. 3,841,932 discloses a surface patch for windshield glass, which leaves a superficial dam which is removed.

U.S. Pat. No. 3,914,145 discloses a flush patch casting for the repair of plate glass.

U.S. Pat. No. 4,147,576 is a substantially invisible PVC auto body non transparent repair over a damaged area.

U.S. Pat. No. 4,094,316 is a decorative applique overlay adherable to bandage.

U.S. Pat. No. 4,588,619 is a reflective panel for diffusion of light in an automotive lens housing.

U.S. Pat. No. 4,221,465 is a patching tape to alter the light transmissive characteristics of a view graph.

U.S. Pat. No. 4,661,182 is a non transparent substantially invisible surface repair of the damaged glossy surface of an auto body.

U.S. Pat. No. 2,833,237 is a laminated tire patch with an adhesive layer.

U.S. Pat. No. 3,939,337 is an elastomeric gasket for a light housing assembly for mounting a lens.

SUMMARY OF THE INVENTION

According to the present invention, a kit and method are provided for repairing a break in the lens of an automobile light bulb housing. The kit and method are an inexpensive and labor saving simplification of the prior art complex systems of plastic castings, employing gaskets and/or molds or using tapes or overlays.

The problems solved by the present invention are to provide a simple, inexpensive repair to an automobile light bulb housing lens without having to replace the housing. The repairing of the automobile light bulb housing lens is in situ, maintaining substantially the same light diffusion characteristics of the original lens and maintaining the integrity of the repaired housing with a bulb inside.

The kit preferably includes two adhesive gaskets, a diffuser and a selection of repair panels. The kit is preferably mounted on a display card in the form of a blister pack. The diffuser can be an integral part of the enclosing blister.

The method includes selecting an outer panel to match the color of the lens. The outer panel is then outlined over the break, trimmed with a scissors or otherwise cut to form a template. It is preferable for the template to extend beyond the periphery of the break in the form of a rectangle or square. The gaskets and diffuser are trimmed to the panel template. The gaskets, for convenience, have release papers over adhesive layers on either side. The release paper on one side of a gasket is removed, the exposed adhesive part of the gasket is then placed over the break, the other release paper is removed, the template size diffuser is laminated to the gasket, the other gasket is then set in place after appropriately removing the release papers and the outer panel is emplaced.

BRIEF DESCRIPTION OF THE DRAWING

Although such novel feature or features believed to be characteristic of the invention are pointed out in the claims, the invention and the manner in which it may be carried out may be further understood by reference to the description following and the accompanying drawings.

FIG. 1 is a plan view of the elements of the automobile light bulb housing repair kit of the present invention.

FIG. 2 is a front elevation view of the automobile light bulb housing repair kit mounting card with the blister cover exploded away.

FIG. 3 is a front elevation of a repaired lens.

FIG. 4 is an isometric exploded view of the repaired lens of FIG. 3.

FIG. 5 is a schematic detail section of a gasket of FIG. 4 including outer release paper over the adhesive.

FIG. 6 is a schematic detail vertical section of FIG. 4, viewed through the repair on the lens from the left showing the laminated parts.

FIG. 7 shows a front elevation of the detail of the diffuser of FIG. 4.

FIG. 8 is a view of a broken lens configuration.

FIG. 9 is a view of another broken lens configuration.

DESCRIPTION OF THE FIGURES

Figure 10:
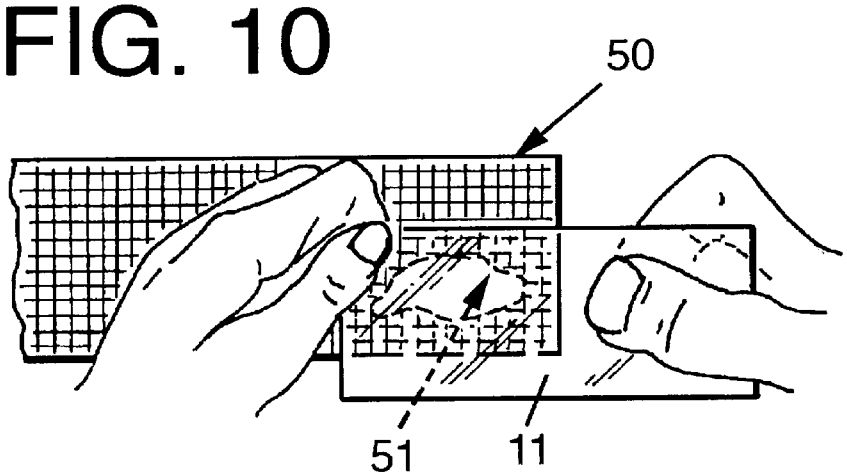
FIG. 10 shows the marking of an outer repair panel to outline a shape of an outer panel template beyond the periphery of the break.

Referring now to the figures in greater detail, where like reference numbers denote like parts in the various figures.

The lens repair kit 10 as shown in FIG. 1 comprises a selection of plastic outer panels 11–13 including a red plastic outer panel 11, amber plastic outer panel 12 and a clear plastic outer panel 13. There are gaskets 20 and a blister cover 30. The blister cover 30 is of plastic and has a peripheral flange portion 31. As shown in FIG. 2, the blister cover 30 is mountable on a display card 14 with the flange portion 31 engaging the display card 14 completing a package to hold the gaskets 20 and plastic outer panels 11–13.

FIG. 3 shows a repaired lens 50. FIG. 4 shows the lens 50 with the repair to the break 51, with the exploded outer panel template 60, first shaped gasket 61, shaped diffuser 62 and the second shaped gasket 63.

The gasket 20 as shown in FIG. 5 has a gasket body 28 with an adhesive 22 layer on each of its surfaces. As shown, standing alone in FIG. 5, the adhesive 22 is covered by release paper 26.

FIG. 6 shows the details of the laminations of FIG. 4. The second shaped gasket 63 has the release paper 26 removed. The adhesive 22 on one side of a gasket 20 is engaged over the lens 50 at the break 51. The other adhesive 22 on the other side of the second shaped gasket 63 engages the shaped diffuser 62 on one side. The first shaped gasket 61 has the release paper 26 removed. One layer of adhesive 22 of the first shaped gasket 61 engages the other side of the diffuser pattern 40. The other adhesive 22 on the other side of the first shaped gasket 61 engages the inside surface of the outer panel template 60 which in FIGS. 3, 4, and 6 have been selected from the red plastic outer panel 11.

FIG. 7 shows a front elevation of the detail of the light diffuser pattern 40 which is part of the shaped diffuser 62 of FIG. 4 showing, the first diffuser pattern part 41, second diffuser pattern part 42 and ridge line 43.

OPERATION

The lens repair kit 10 of the present invention comes in a package comprising the display card 14 and blister cover 30. The blister cover 30 mounted on the display card 14 with the flange portion 31 engaging the display card 14 forms a hollow. In the package the lens repair kit 10 includes the gaskets 20 and plastic outer panels 11–13.

As shown in FIG. 1, there is a first and second gasket 20, a red plastic outer panel 11, an amber plastic outer panel 12, a clear plastic outer panel 13 and the blister cover 30.

In use, the package is opened and one of the panels 11–13 is selected to match the color of the lens such as the lens 50 with its break 51.

As shown in FIG. 6, a red plastic outer panel 11 was selected to match the lens 50 which us red. The usual lens colors are clear, amber and red. The selected red plastic outer panel 11 is then used to form a outer panel template 60 for the repair. The panels 11–13 are all cuttable so that they can be shaped to make a shaped diffuser 62 from the diffuser pattern 40 of the blister cover 30 and to make the first shaped gasket 61 and second shaped gasket 63 from the gaskets 20.

In a preferred embodiment of the repair as shown in FIG. 10, the selected red plastic outer panel 11 is matched to the break 51 and cut into a rectangular shape to amply extend beyond the periphery of the break 51.

The panels 11–13 are preferably made of a plastic that is at least translucent or transparent. In the case of the red plastic outer panel 11 it includes a translucent or transparent pigment, tint, or other means of coloring so that light from a bulb in the housing is seen in the selected color. The color selection helps obscure the repair.

The panels 11–13 are preferably made of a plastic that is stiff, but resilient, and which has the capability of being thermoset or resettable, by being softened in very hot water and reshaped to conform to the outer contour of a broken lens. Thus, a break 52 in the lens 50, as shown in FIG. 8 on the curved portion of the lens, can have a conforming repair. By the same token, a curved broken lens 45, such as shown in FIG. 9 with a break 46 and break 47 may be repaired in a single repair or two repairs meeting the contour of the broken lens 45.

The panels 11–13 are preferably made of a plastic such as red D 21 or amber D 18 or clear, rigid polyvinyl chloride, calendered and pressed polished, provided by AIN Plastics of Mount Vernon, N.Y.

Figure 11:
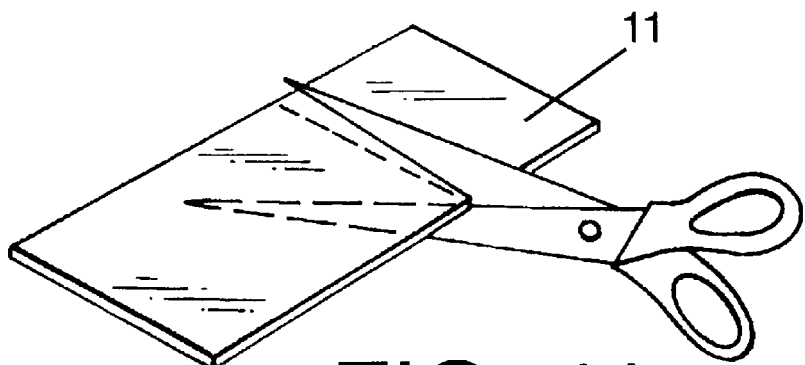
FIG. 11 shows the trimming of the outer panel to form a template.
Figure 12:
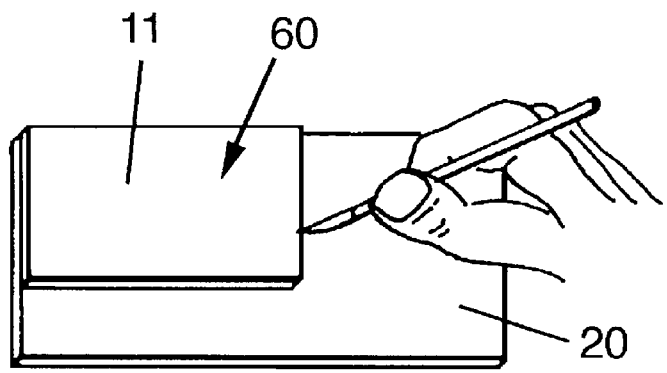
FIG. 12 shows using an outer panel template used for outlining an adhesive gasket to be cut.
Figure 13:
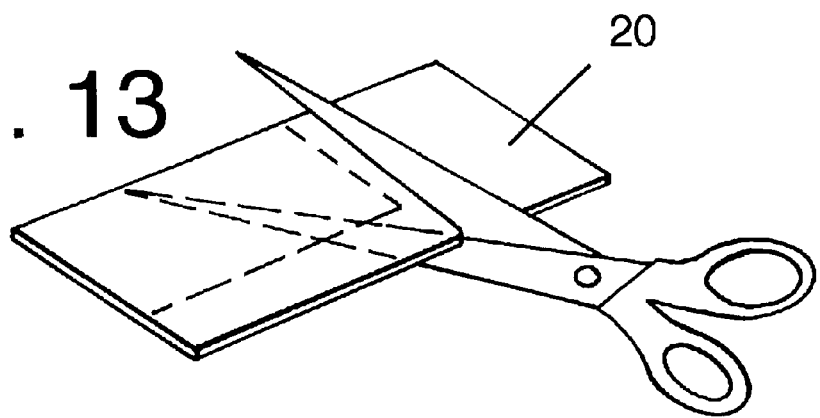
FIG. 13 shows the trimming of the adhesive gasket of FIG. 12.

The outer panel template 60 is cut out of the red plastic outer panel 11, as shown in FIG. 11. It serves as a template for cutting the gaskets 20 to size, as shown in FIGS. 12 and 13. It is convenient to cut a gasket 20 with the release paper 26 on the adhesive 22 layers as shown in FIGS. 5 and 13. Once the outer panel template 60 has been cut to size, the first shaped gasket 61, shaped diffuser 62 and second shaped gasket 63 formed, the outer panel template 60 can be thermo molded to the shape of a break such as a break 52.

The diffuser pattern 40 is shaped from the outer panel template 60, cut from the plastic of the blister cover 30. The blister cover 30 includes the light diffuser pattern 40 as shown in FIG. 7.

The light diffuser pattern 40, as shown in FIG. 7, has a first diffuser pattern part 41 and a second diffuser pattern part 42 each alternating in parallel rows. The first diffuser pattern parts 41 and second diffuser pattern parts 42 are on different planes. Thus, as can be seen in FIG. 6, there is no path nor interstices for liquid or any contaminant to pass beyond the ridge line 43 joining the pattern parts 41, 42 once they have been engaged on the adhesive 22 of a gasket 20.

The red plastic outer panel template 60, first shaped gasket 61, shaped diffuser 62 and the first and second shaped gaskets 61, 63, with their adhesive 22 layers, are all so thin that they blend with the lens 50 rendering the repair of the break 51 substantially invisible.

The red plastic outer panel template 60, first shaped gasket 61, shaped diffuser 62 and the first and second shaped gaskets 61, 63, with their adhesive 22 layers are transparent, or at least translucent, to transmit light through the lens 50 diffused but without substantially distortion, creating the effect of an unbroken lens.

The red plastic outer panel template 60, first shaped gasket 61, shaped diffuser 62 and the first and second shaped gaskets 61, 63, with their adhesive 22 layers, at least, are flexible and the red plastic outer panel template 60 and shaped diffuser 62 are resilient to serve their functions of conforming to the shape of the lens. The panels 11–13 also have a hardness to withstand wear and minor abrasion.

The diffuser pattern 40 is preferably also slightly frosted to create a more uniform diffusion pattern. The gasket body 28 is preferably Mylar® or of some other clear flexible plastic.

The gaskets 20, and panels 11–13 are selected in modular sizes to accommodate a selection of lens break sizes. Thus, the size of the display card 14 and the blister cover 30 limit the size of the area to be covered by the repair in that particular lens repair kit 10.

The gaskets 20, and panels 11–13 must fit into the hollow formed in the blister cover 30 between the light diffuser pattern 40 and the flange portion 31 in order to fit on the display card 14. The elements of the lens repair kit 10 of the present invention do not necessarily have to be mounted on the display card 14. They can be packaged to accommodate larger or smaller size parts or in set packages for single color repair. The light diffuser pattern 40 does not have to be integral with the blister cover 30 and can be separately supplied in a package or even within a blister package.

The method of repair includes removing the gaskets 20 and panels 11–13 from the blister cover 30, cutting the selected outer panel 11–13 to form a working template such as outer panel template 60.

The method includes selecting an outer panel 11–13 to match the color of the lens 50. The outer panel, such as the red plastic outer panel 11, is then outlined over the break as shown in FIG. 10. The outline is preferably in a rectangular or square pattern extending beyond the periphery of the break 51. The gasket 20 is trimmed with a scissors or otherwise cut to form an outer panel template 60 as shown in FIG. 11.

Figure 14:
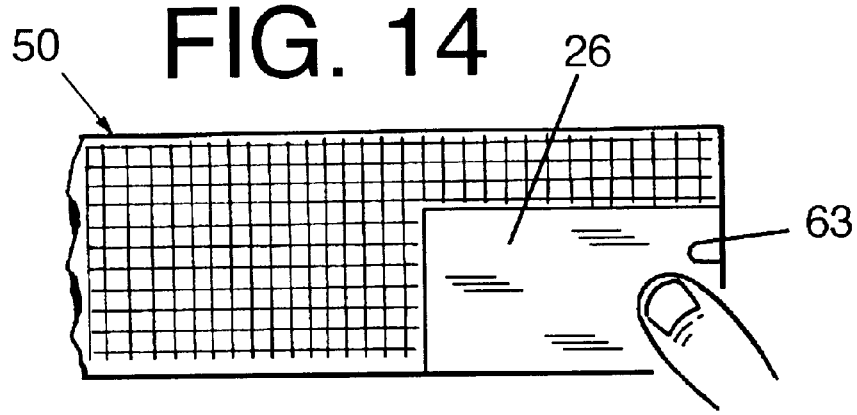
FIG. 14 shows the trimmed adhesive gasket of FIG. 13, applied with its under release paper removed from the adhesive of one side of the gasket.
Figure 15:
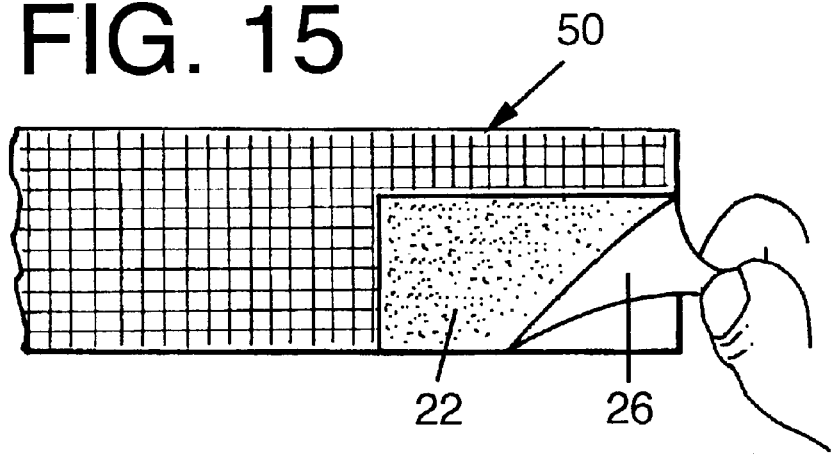
FIG. 15 shows the removal of the other release paper from the adhesive gasket of FIG. 14.

A gaskets 20 and the blister cover 30 are cut and trimmed to the shape of the outer panel template 60 in the manner shown in FIGS. 12–14, to form the first shaped gasket 61, shaped diffuser 62 and the second shaped gasket 63. The gaskets 20 for convenience have release papers 26 over adhesive layers 22 on either side. Once the first shaped gasket 61, shaped diffuser 62 and second shaped gasket 63 have been formed, the release paper 26 on one side of second shaped gasket 63 is removed, the exposed adhesive 22 can then be placed over the break 51, as shown in FIG. 14, then other release paper 26 may be removed as shown in FIG. 15 and the second shaped gasket 63 is laminated to the shaped diffuser 62 on one side.

The process is repeated with the first shaped gasket 61, removing the release paper 26 laminating the first shaped gasket 61 to the other side of the shaped diffuser 62, removing the other release paper 26 and laminating the outer panel template 60 to the first shaped gasket 61, thus completing the repair as shown in FIGS. 3 and 4.

Variations of the sequence of laminating the repair generally does not affect the result.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. A kit for a substantially invisible repair of a selected range of breaks through the lens of an automobile light bulb housing; said lens having an inside portion and an outside portion; said inside portion of said lens within said housing; said outside portion of said lens outside said housing; and said lens including means to diffuse light from a bulb in said housing, and said selected range of breaks each having an outer periphery, and said kit comprising at least four plastic lamina, at least one of said at least four plastic lamina including one transparent adhesive layer adherable to said lens; and a second transparent adherable adhesive layer adherable to a light diffusible lens, said light diffusion means comprising a plastic lamina having no adhesive layer; and including an integral three dimensional offset pattern to diffuse light from a bulb in said housing, said offset pattern including a first diffuser pattern part, a second diffuser pattern part alternately set off from each other, and ridge line defined by said pattern parts, all without interstices and impervious to water passing therethrough to diffuse light substantially equivalent to said light diffusion of said lens light diffusion means, all said plastic lamina selected to be of a size having a perimeter in excess of said selected range of breaks, and all said plastic lamina being translucent.

2. The invention of claim 1 wherein said lens includes a transparent pigment at a selected break and at least one said plastic lamina includes a transparent pigment selected to match said lens pigment at said selected break.

3. The invention of claim 1 wherein at least one of said plastic lamina is frosted.

4. The invention of claim 1 wherein said at least one said plastic lamina is thermosettable.

5. The invention of claim 1 including a display card and said three dimensional offset pattern plastic lamina is a blister cover mounted on said display card.

6. The invention of claim 5 including plastic lamina enclosed within said display card and said blister cover.

7. The invention of claim 1 including at least two said plastic lamina including different translucent pigment.

\* \* \* \* \*